US009576786B2

(12) United States Patent
Greenberg et al.

(10) Patent No.: US 9,576,786 B2
(45) Date of Patent: Feb. 21, 2017

(54) INTELLIGENT RADIO-CONTROLLED PLASMA LIGHT

(71) Applicant: iUNU, LLC, Seattle, WA (US)

(72) Inventors: Adam Phillip Takla Greenberg, San Francisco, CA (US); Kyle Terrence James Rooney, Seattle, WA (US); Travis Anthony Conrad, Bellevue, WA (US)

(73) Assignee: iUNU, LLC, Seattle, WA (US)

( * ) Notice: Subject to any disclaimer, the term of this patent is extended or adjusted under 35 U.S.C. 154(b) by 0 days.

(21) Appl. No.: 14/843,939

(22) Filed: Sep. 2, 2015

(65) Prior Publication Data
US 2016/0064204 A1 Mar. 3, 2016

Related U.S. Application Data

(60) Provisional application No. 62/044,948, filed on Sep. 2, 2014.

(51) Int. Cl.
*H05B 37/02* (2006.01)
*H01J 65/04* (2006.01)
*H01J 61/52* (2006.01)
*A01G 7/04* (2006.01)

(52) U.S. Cl.
CPC .............. *H01J 65/042* (2013.01); *A01G 7/045* (2013.01); *H01J 61/52* (2013.01); *H05B 37/0227* (2013.01)

(58) Field of Classification Search
CPC ... H05B 37/02; H05B 37/02227; H05B 33/08; H05B 33/0809; H01J 65/042; H01J 61/52; A01G 7/045
USPC ................. 315/291, 307, 224–226, 308, 312
See application file for complete search history.

(56) References Cited

U.S. PATENT DOCUMENTS

2015/0008829 A1\* 1/2015 Lurie ................. H05B 37/0245
315/153

\* cited by examiner

*Primary Examiner* — Jimmy Vu
(74) *Attorney, Agent, or Firm* — Han Santos, PLLC

(57) ABSTRACT

The user of plasma light technology and remote lighting control techniques may enable a single master controller to control a large number of lighting fixtures. Multiple lighting fixtures may be equipped with control applications. Each control application may control the radio frequency driver of a lighting fixture that drives the plasma bulbs of the lighting fixture to produce light output for growing plants. The master controlled may execute on one or more computing devices. The master controller may send input instructions to the control applications of the lighting fixtures via a network. The instructions may be implemented by the control applications to command the radio frequency drivers to regulate a spectral distribution and/or intensity of the light output of the lighting fixtures.

20 Claims, 4 Drawing Sheets

INTELLIGENT RADIO-CONTROLLED PLASMA LIGHT

CROSS REFERENCE TO RELATED PATENT APPLICATION

This application claims priority to U.S. Provisional Patent Application No. 62/044,948, filed on Sep. 2, 2014, entitled "Intelligent Radio-Controlled Plasma Light," which is hereby incorporated by reference in its entirety.

BACKGROUND

Horticultural grow lights are subject to performance tradeoffs between multiple factors. The multiple factors may include power efficiency, light intensity, and quality of light coverage. With respect to efficiency, some conventional solutions are energy intensive and produce excessive heat radiation. For example, high intensity discharge (HID) bulbs may degrade over time, which means they have to be replaced regularly to maximize photosynthetic activity. Light emitting diode (LED) lights have longer lifespans but are difficult to service and often fail to produce a full light spectrum.

With respect to intensity, plants generally thrive with 600 µMols of light during their vegetative growth stage, and 800 µMols to 1000 µMols for the flowering stage. As used herein, Mol refers to one mole of light that illuminates a surface, specifically Avogadro's number of photons illuminating the surface. Both stages rely on even distribution of light across an intended canopy space to achieve maximum growth.

With respect to quality of light coverage, plants have been evolving for millions of years under light spectrum from the sun. Recreating that light spectrum in an indoor environment has always been a challenge. For example, some lighting solutions rely on different types of light sources, such as a combination of high pressure sodium (HPS) bulbs, metal halide (MH) bulbs, and ultraviolet (UV) bulbs to create a well-rounded light spectrum. LED lights may easily target specific wavelengths, but a full light spectrum may at best be created using a large array of diodes having varied color temperatures. However, the use of such a large array of diodes adds hardware complexity and may generate excessive heat. Furthermore, lighting solutions that are able to avoid the problems of incandescent lights, HID lights, and LED lights may not have controllers with sufficient control fidelity or solution integration.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for using a master controller to control multiple lighting fixtures via a network. In various embodiments, the network may be a wired network or a wireless network. The master controller may send instructions to a control application in each of the lighting fixtures. The instructions may control the properties of the light that is produced by each lighting fixture. The properties of the produced light may include an amount of light, the spectral distribution of the light, the intensity of the light, the amount of light provided to one or more plants, and/or so forth. Spectral distribution of the light refers to the distribution of energy radiated at different wavelengths in the spectrum of the light, and different light outputs may have different spectral distribution.

The master controller may have the ability to control a larger number of lighting fixtures, such as hundreds or thousands of lighting fixtures, via the network. In scenarios that involve plasma lighting fixtures, the master controller may provide full spectrum control over the light produced by individual lighting fixtures or groups of lighting fixtures. Accordingly, the master controller may execute rules or recipes that adjust the light spectrum produced by individual lighting fixtures or groups of lighting fixtures throughout the day to mimic the wavelengths and intensities of natural light that is produced by the sun. In contrast, the functionalities provided by conventional networked light controllers may be limited to turning lighting fixtures on and off, and reporting the on/off statuses of the lighting fixtures.

The master controller may receive sensor inputs from sensors that are internal and/or external to the lighting fixtures. Such sensors may measure the environmental conditions that affect plant growth and the operational conditions of the lighting fixtures. Accordingly, the master controller may send instructions in order to adjust the properties of the light that is produced by individual lighting fixtures or groups of lighting fixtures. These instructions may enable the light produced by the lighting fixtures to adapt to the environmental conditions. Thus, the ability of the master controller to remotely monitor and control individual lighting fixtures may be especially valuable in a large scale horticultural production setting that involves hundreds or thousands of lighting fixtures.

Example Architecture

Figure 1:
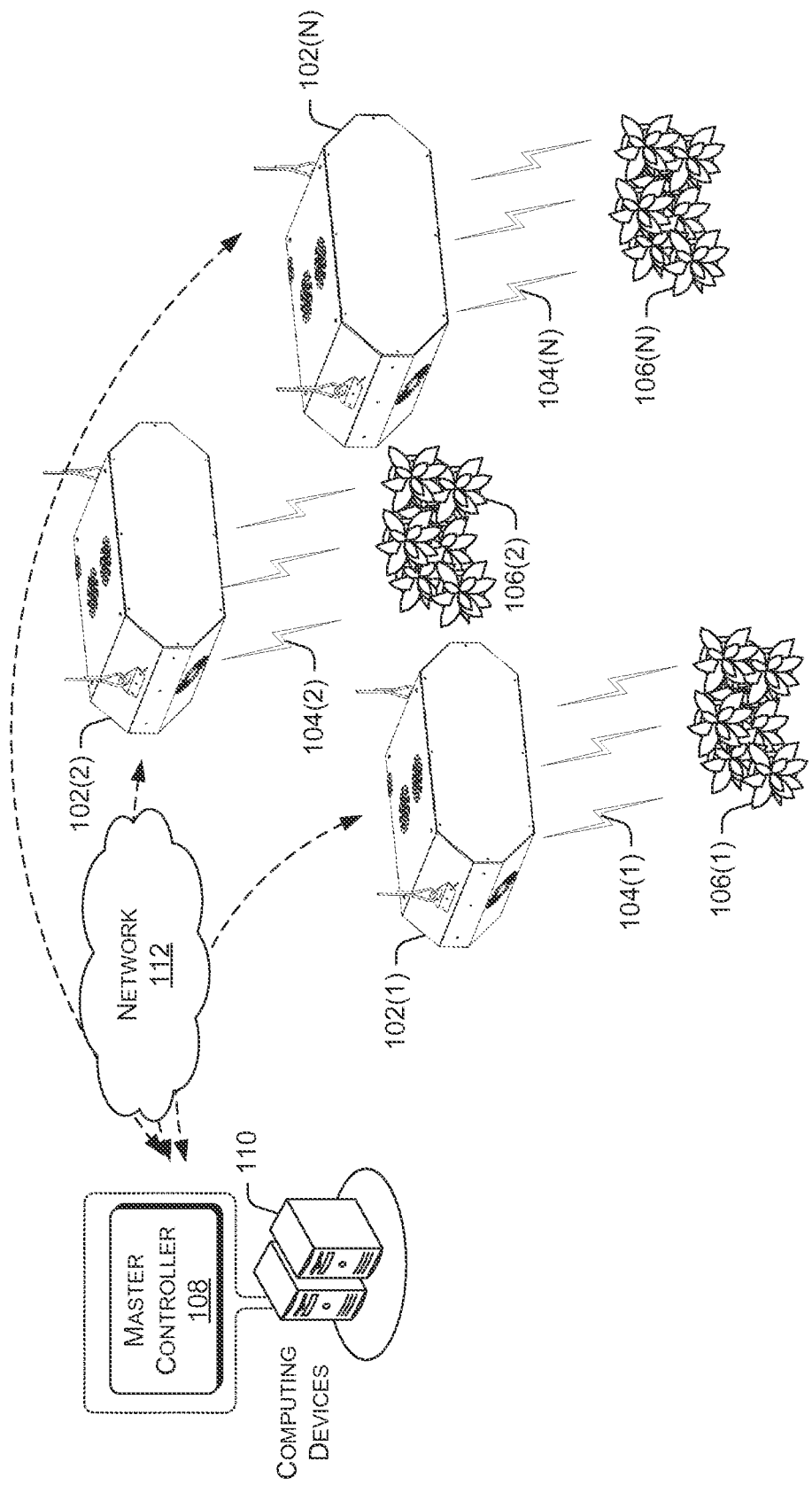
FIG. 1 illustrates an example architecture for using a master controller to remotely control lighting fixtures via a network.

FIG. 1 illustrates an example architecture 100 for using a master controller to remotely control lighting fixtures via a network. The architecture 100 may include multiple lighting fixtures, such as the lighting fixtures 102(1)-102(N). In various embodiments, each of the lighting fixtures may be equipped with one or more plasma bulbs, a control application, a radio frequency driver, a cooling fan, sensors, as well as other components. Each of the plasma bulbs may generate full spectrum light for growing plants. For example, each of the lighting fixtures 102(1)-102(N) may respectively generate light output 104(1)-104(N), which may be directed to plants 106(1)-106(N). The radio frequency driver of each lighting fixture may convert electrical power that is received by the lighting fixture into energy that drives the plasma bulbs to produce the full spectrum light. The cooling fan in each lighting fixture may circulate air to cool the lighting fixture during operation. The control application of each lighting fixture may receive inputs from sensors and transmit the sensor inputs to a master controller 108. Additionally, the control application may receive instructions from the master controller 108. The control application may instruct the radio frequency driver based on the instructions to control the properties of the light that are produced by the lighting fixture. Alternatively, the control application in each lighting fixture may control a corresponding radio frequency driver based on the sensor inputs independently of the master controller 108.

The master controller 108 may be a software application that executes on one or more computing devices 110. The computing devices 110 may include general purpose computers, such as desktop computers, tablet computers, laptop computers, servers, and so forth. However, in other embodiments, the computing devices 110 may include smart phones, game consoles, or other electronic devices that are capable of receiving inputs, processing the inputs, and generating output data. In some embodiments, the computing devices 110 may be implemented as a part of a computing cloud. In alternative embodiments, the master controller 108 may be executed on one or more virtual machines, virtual private servers, software containers, and/or so forth. The master controller 108 may communicate with the control applications of the lighting fixtures 104(1)-104(N) via a network 112. In various embodiments, the network 112 may be a local area network (LAN), a larger network such as a wide area network (WAN), or a collection of networks, such as the Internet. The network 112 may include wireless and/or wired network infrastructure and communication components. For example, the infrastructure and communication components may provide communication over Wi-Fi, Bluetooth, cellular, Ethernet, and/or so forth.

The master controller 108 may send instructions to the control application in each of the lighting fixtures 102(1)-102(N) via the network 112. The instructions may control the properties of the light that is produced by each lighting fixture. The properties of the produced light that is controlled may include an amount of light, the spectral distribution of the light, the intensity of the light produced, the amount of light that is provided to one or more plants, and/or so forth. In some instances, the instructions that are provided by the master controller 108 to a lighting fixture may directly command the lighting fixture to produce light having specific properties. In other instances, the instructions that are provided by the master controller may modify a rule or a recipe that controls the properties of the light that is produced by the lighting fixture.

The master controller 108 may receive sensor inputs via the network 112. In turn, the master controller 108 may generate the instructions to the multiple lighting fixtures based on the sensor inputs. The sensor inputs may be from sensors that are internal to the lighting fixtures 102(1)-102(N). For example, such sensors may include fan speed sensors, fixture temperature sensors, and/or so forth. Alternatively or concurrently, the sensor inputs may be from sensors that are external to the lighting fixtures. For example, such sensors may include ambient air temperature sensors, ambient humidity sensors, soil moisture sensors, ultrasound sensors, light sensors, moisture sensors, image sensors, and/or other sensors that are relevant to horticulture. In this way, the master controller 108 may respond to environmental conditions that affect plant growth, as well as respond to the operational conditions of the lighting fixtures. Thus, the master controller 108 may provide instructions to the lighting fixtures in order to maximize plant yield while minimizing resource usage and operation costs.

The ability of the master controller 108 to receive sensor inputs from sensors that are internal and/or external to the lighting fixtures may provide several advantages. For example, a fixture temperature sensor in a lighting fixture may send sensor data to the master controller 108 indicating that there is an abnormal temperature reading. In turn, the master controller 108 may reduce power to the lighting fixture or shut down the lighting fixture to avoid a catastrophic failure of the lighting fixture. In another example, an ultrasound sensor that measures the distance between a lighting fixture and the canopy of a plant may indicate to the master controller 108 that the distance has changed due to the growth of the plant. Accordingly, the master controller 108 may send an instruction to an actuator or motor that controls the height of the lighting fixture in relation to the plant to adjust the amount or intensity of the light distributed to the plant.

The lighting fixtures 102(1)-102(N) may be located in the same location or different locations. In some instances, the lighting fixtures 102(1)-102(N) may be in the same area of a horticultural facility, or in different areas of the horticultural facility that have differing growth environments. For example, the different areas may have different temperature and/or humidity suitable for growing different types of plants. In other instances, the lighting fixtures 102(1)-102(N) may be located in different horticultural facilities in a general geographical area, or even in horticultural facilities that are located in different parts of the world. The different horticultural facilities may provide similar or different growth environments.

Example Computing Device Components

Figure 2:
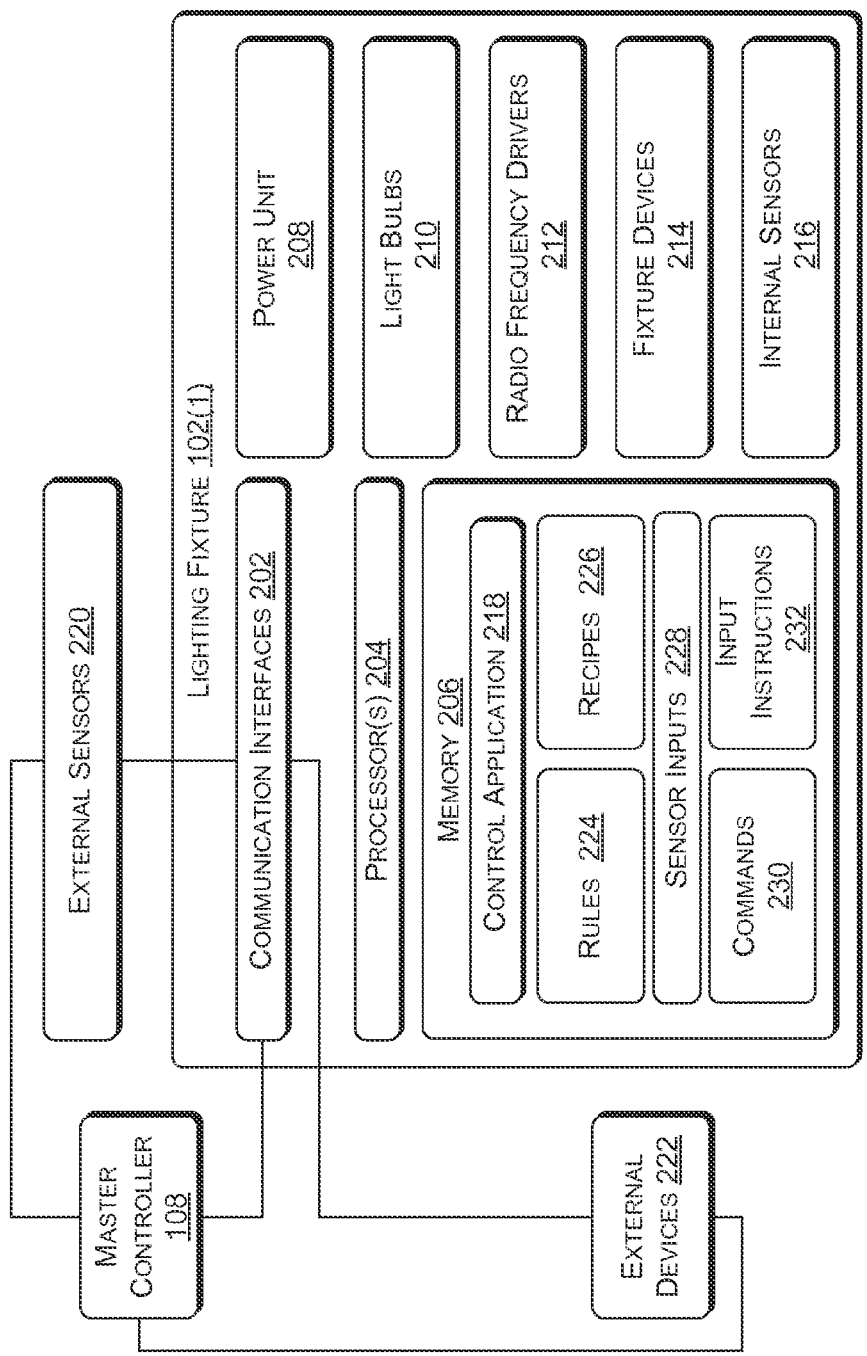
FIG. 2 is a block diagram showing various components of a lighting fixture that receives instructions from a master controller via a network and implements the instructions to control light bulbs and other devices associated with the lighting fixture.

FIG. 2 is a block diagram showing various components of a lighting fixture that receives instructions from a master controller via a network. As an example, the lighting fixture may be the lighting fixture 102(1). In turn, the lighting fixture 102(1) may implement instructions to control the light bulbs and other devices associated with the lighting fixture. The lighting fixture 102(1) may include a communication interface 202, one or more processors 204, memory 206, a power unit 208, one or more light bulbs 210, one or more radio frequency drivers 212, fixture devices 214, and internal sensors 216.

Each of the processors 204 may be a single-core processor, a multi-core processor, a complex instruction set computing (CISC) processor, or another type of processor. The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. The processors 204 and the memory 206 of the computing devices 110 may implement a control application 218. The control application 218 may include routines, program instructions, objects, and/or data structures that perform particular tasks or implement particular abstract data types. Additionally, the memory 206 may store rules 224 and recipes 226.

The communication interfaces 202 may include wireless and/or wired communication components that enable the control application 218 to send sensor inputs from the internal sensors 216 to the master controller 108, and receive instructions from the master controller 108. For example, the communication interfaces 202 may include an Ethernet controller that uses interfaces RS232, RS485, and/or RS422, and protocols such as TCP, IP, UDP, Telnet, ARP, DHCP, ICMP, PPPoE, HTTP, DDNS, and/or so forth. In other example, the communication interfaces 202 may support other communication technologies, such as Bluetooth, universal serial bus (USB), near field communication (NFC), etc. The communication interfaces 202 may further include transceivers, radios, and antennas that support the multiple communication technologies and protocols. The communication interfaces 202 may further include a communication bus that enables the various components of the lighting fixture 102(1) to communicate with each other. For example, the communication bus may be a serial bus, a parallel bus, and/or so forth. The power unit 208 may be capable of receiving power from an external power source, such as an alternating current (AC) power source. The power unit 208 may convert the AC power source into energy that is capable of causing the one or more light bulbs 210 to produce light by changing voltage, current, and/or other electrical properties of the AC power source. In some embodiments, the power unit 208 may incorporate a power rectifier, a fusible link, a circuit breaker, a switch, or any other types of regulatory and/or control features. In some embodiments, these components integrated into a controller board or a single-board microcomputer, such as a Zigbee module, an Arduino single-board microcontroller, a Raspberry Pi single-bard computer.

The light bulbs 210 may include one or more plasma bulbs that use the excitation of a plasma gas to generate light. Each of the radio frequency drivers 212 may use the electrical power provided by the power unit 208 to produce radio frequency (RF) energy. In turn, the RF energy may excite the plasma gas in each of the plasma bulbs to produce light. The spectral distribution and intensity of the light produced by each of the light bulbs 210 may be controlled by a corresponding radio frequency drivers 212. For example, a radio frequency driver may vary the frequency of the RF energy to change the spectral distribution of the light generated by a plasma bulb. In another example, a radio frequency driver may vary the amplitude of the RF energy to change the intensity of the light generated by the plasma bulb. In various embodiments, each of the radio frequency drivers 212 may vary the frequency and amplitude of the RF energy based on commands 230 produced by the control application 218. Each of the radio frequency drivers 212 may receive the commands from the control application 218 via the communication interfaces 202.

In some instances, the commands 230 produced by the control application 218 may command each of the radio frequency drivers 212 to act independently to generate differentiated light output. In other words, each of the radio frequency drivers 212 may cause a corresponding light bulb to produce light output that is different in spectral distribution or light intensity from at least one other light bulb of the lighting fixture 102(1). For example, a first driver of the radio frequency drivers 212 may cause a first plasma bulb in the lighting fixture 102(1) to produce light output that has a particular spectral range, while a second driver of the radio frequency drivers 212 may cause a second plasma bulb in the lighting fixture 102(1) to produce light output having another spectral range that differs from the particular spectral range. Alternatively or concurrently, the first and second frequency drivers may also cause the first and second plasma bulbs to produce light outputs of different light intensities.

The fixture devices 214 may include other components that enable the lighting fixture to provide light to plants. The fixture devices 214 may include light bulb sockets, cooling fans, movable louvers, adjustable reflectors, actuators, motors, RF grounding shields, and/or so forth. The one or more cooling fans may be used to manage the heat that is generated by the electrical components of the lighting fixture 102(1) in a reverse convection fashion, so that the electronic components may be cooled. The cooling fans may respond to inputs from the control application 218.

The movable louvers may be mounted over the light distribution opening of the lighting fixture 102(1). The positions of the movable louvers may range from fully open to fully shut to control the amount of light that emanates from the lighting fixture 102(1). The movable louvers may be positioned via actuators that are controlled by the control application 218. For example, the control application 218 may activate or deactivate the actuators by controlling the amount of electrical power that is delivered to the actuators. The adjustable reflectors may be operated via motors or actuators to control the direction of the light that is emitted by the lighting fixture 102(1). The operation of the reflector motors or actuators may be controlled by the control application 218 via the regulation of electrical power to these devices.

The internal sensors 216 may monitor the operational conditions of the lighting fixture 200. The sensors may include a fan speed sensor, a radio frequency driver temperature sensor, a light bulb temperature sensor, and/or so forth. The fan speed sensor may sense the speed of the cooling fan in the lighting fixture. The various temperature sensors may sensing the temperature of the respective lighting fixture components. The internal sensors 216 may provide sensor data to the control application 218. In at least some embodiments, the control application 218 may transmit the sensor data to the master controller 108 via the network 112.

In some embodiments, the master controller 108 may also receive sensor data from the external sensors 220 and control the external devices 222 via the network 112. The external sensors 220 may include networked sensors that monitor the environmental conditions for the growth of plants that are receiving light energy from the lighting fixtures 102(1)-102(N). Some of the external sensors 220 may also directly monitor the growth of the plants. For example, the external sensors 220 may include an ambient temperature sensor, an ambient humidity sensor, a soil moisture sensor, an image sensor with associated image analysis software that monitor the growth of one or more plants, a light intensity sensor, an ultrasound sensor that measures the distance between the lighting fixture 102(1) and the canopy of a plant, and/or so forth. The external devices 222 may include irrigation control systems, Heating Ventilation and Air Conditioning (HVAC) systems, nutrient feeding systems, humidifiers, dehumidifiers, and/or so forth.

In some embodiments, the external sensors 220 may provide sensor data to the control application 218. For example, the sensor data from the external sensors 220 may be routed by the master controller 108 to the control application 218 via the network 112. Alternatively, the communication interface 202 of the lighting fixture 102(2) may enable the control application 218 to directly receive sensor data from the external sensors 220 via wired or wireless communication interfaces. For example, the sensor data from the external sensors 220 may be routed to the lighting fixture 102(1) via Bluetooth, USB, NFC, and/or Wi-Fi connections.

In various embodiments, the control application 218 may use rules 224 and recipes 226 to control the light output of the lighting fixture 102(1). A rule may specify that the control application 218 generate particular commands to one or more radio frequency drivers 212 and/or one or more fixture device 214 in response a specific sensor input, such as one of the sensor inputs 228. For example, the control application 218 may command the cooling fan of the lighting fixture 102(1) to increase speed when a temperature of the one or more radio frequency drivers 212 exceed a temperature threshold. In another example, the control application 218 may command the one or more radio frequency drivers 212 to decrease light intensity when the ultrasound sensor indicates that the canopy of a plant is within a predetermined distance of the lighting fixture. A recipe may specify that the control application 218 send particular commands to the one or more radio frequency drivers 212 and/or one or more fixture device 214 over a growth period. In various scenarios, the recipe may specify that the control application 218 change the light spectrum and/or intensity of the light output to simulate sunlight variance during a day cycle, a week cycle, a month cycle, a seasonal cycle, or another growth cycle. The plant growth target for each of the growth cycles may also be specified by a recipe. Such changes may enable the control application 218 to control lighting conditions that replicate or improve plant growth conditions in an artificial environment. In this way, the control application 218 may use a recipe to perform time shifting of plant growth, such as extending the growing season for an annual plant, enable the flowering of a perennial plant in winter, allowing annual plants to behave as perennials, and/or so forth.

Some of the recipes may also specify that the control application 218 send particular commands to the one or more radio frequency drivers 212 and/or one or more fixture device 214 in response to one or more of the sensor inputs 228. For example, the control application 218 may receive sensor data from a soil moisture sensor over a growth period. Accordingly, the control application 218 may send commands that cause the one or more radio frequency drivers 212 to adjust the intensity of the light outputted by the lighting fixture 102(1) based on the soil moisture condition for a plant. In another example, the control application 218 may receive sensor data from an image sensor that shows the growth of a plant over a growth cycle. Accordingly, the control application 218 may send commands that cause the one or more radio frequency drivers 212 to adjust the programmed light output durations that simulate daylight periods to ensure that the growth of the plant meets predetermined growth metrics. Accordingly, the sensor inputs may act as feedback loop information that modifies the execution of the rules or the recipes.

The control application 218 may receive input instructions 232 from the master controller 108. In some embodiments, the input instructions 232 may be instructions that are intended to be directly implemented by the one or more radio frequency drivers 212 and/or the fixture devices 214. In such embodiments, the master controller 108 may generate the input instructions according to a rule or a recipe that is being implemented by the master controller 108. In some embodiments, the master controller 108 may be executing a local rule or recipe that controls multiple lighting fixtures, such as the lighting fixtures 102(1)-102(N). Accordingly, such input instructions may temporarily or permanently override the current rule or recipe local to the lighting fixture 102(1) that is being executed by the control application 218. Such instructions may be marked with indicators or flags indicating to the control applications that such instructions are for direct implementation. In some instances, the input instructions that are intended to be directly implemented may command the radio frequency drivers 212 to cause the light bulbs 210 of the lighting fixture 102(2) to generate differentiated light output, in which a light bulb of the lighting fixture 102(1) produces light output that is different in at least one of spectral distribution or light intensity from at least one other light bulb of the lighting fixture 102(1).

In other embodiments, the input instructions 232 may be instructions that are intended to modify the rules and recipes that are stored in lighting fixtures, such as the rules 224 and the recipes 226 that are stored in the lighting fixture 102(1). For example, an input instruction from the master controller 108 may modify a temperature threshold that a rule uses to specify the activation of a cooling fan for the lighting fixture 102(1). In another example, the input instruction from the master controller 108 may modify an intensity of light that is to be produced according to a recipe for a particular growth cycle. In an additional example, the input instruction for the master controller 108 may modify a light spectrum that is to be produced according to a rule or a recipe in response to one or more sensor inputs, such as soil moisture reading, ambient temperature, ambient humidity, and/or so forth.

In this way, the master controller 108 may control groups of lighting fixtures regardless of their locations. For example, the master controller 108 may implement a particular rule or recipe for a group of lighting fixtures that are in the same location or in geographical disparate locations. The master controller 108 may also implement combinations of rules and recipes for a group of lighting fixtures. For example, the master controller 108 may implement a recipe for a group of lighting fixtures while at the same time implement a rule for a subgroup of lighting fixtures in the group of the lighting fixtures, and vice versa. In another example, the master controller 108 may simultaneously instruct different groups of lighting fixture to generate light that differ in spectral distribution or intensity to adapt to different local environment conditions, follow different rules or recipes, achieve different growth or production goals, and/or so forth. In some embodiments, the master controller 108 may also send software updates and software patches to the control applications of lighting fixtures. The software patches may include fixes to software errors in the control applications. The software updates may include new rules and/or recipes that are to be implemented by the control applications, or new versions of control applications.

In various embodiments, each of the master controller 108 and the control application 218 may be equipped with a web interface application that is accessible via a web browser. The web interface application may enable a user to create, activate, modify, and delete rules and recipes for use, as well as export rules and recipes to individual lighting fixtures for implementation. The web interface application may additionally include controls for selecting individual lighting fixtures, regardless of their location, for placement into new or existing groups, as well as delete groups of lighting fixtures. The web interface application may further enable the user to directly send instructions to the radio frequency drivers and fixture devices of individually lighting fixtures or one or more groups of lighting fixtures. In some embodiments, the web interface application may include a user authentication mechanism for login to access the features provided by the web interface application. The user authentication mechanism may specify that each authorized user is to use one or more authentication credentials to gain access to the web interface application. The authentication credentials may include user name, user password, digital authentication tokens, biometric inputs, and/or so forth.

The master controller 108 may also send instructions to the external devices 222 for the purpose of regulating these devices according to rules and recipes. In various embodiments, the master controller 108 may adjust an irrigation control value to control the amount of water provided to a plant in a particular growth environment, command a HVAC system to cool or heat an enclosed space to a specific temperature, or command a humidifier to regulate the humidity in a space according to a predetermined recipe. In some embodiments, the master controller 108 may route the instructions for one or more external devices to the lighting fixture 102(1) via the network 112. In turn, the lighting fixture 102(1) may route the instructions to the one or more external devices via wireless or wired communication.

Example Processes

Figure 3:
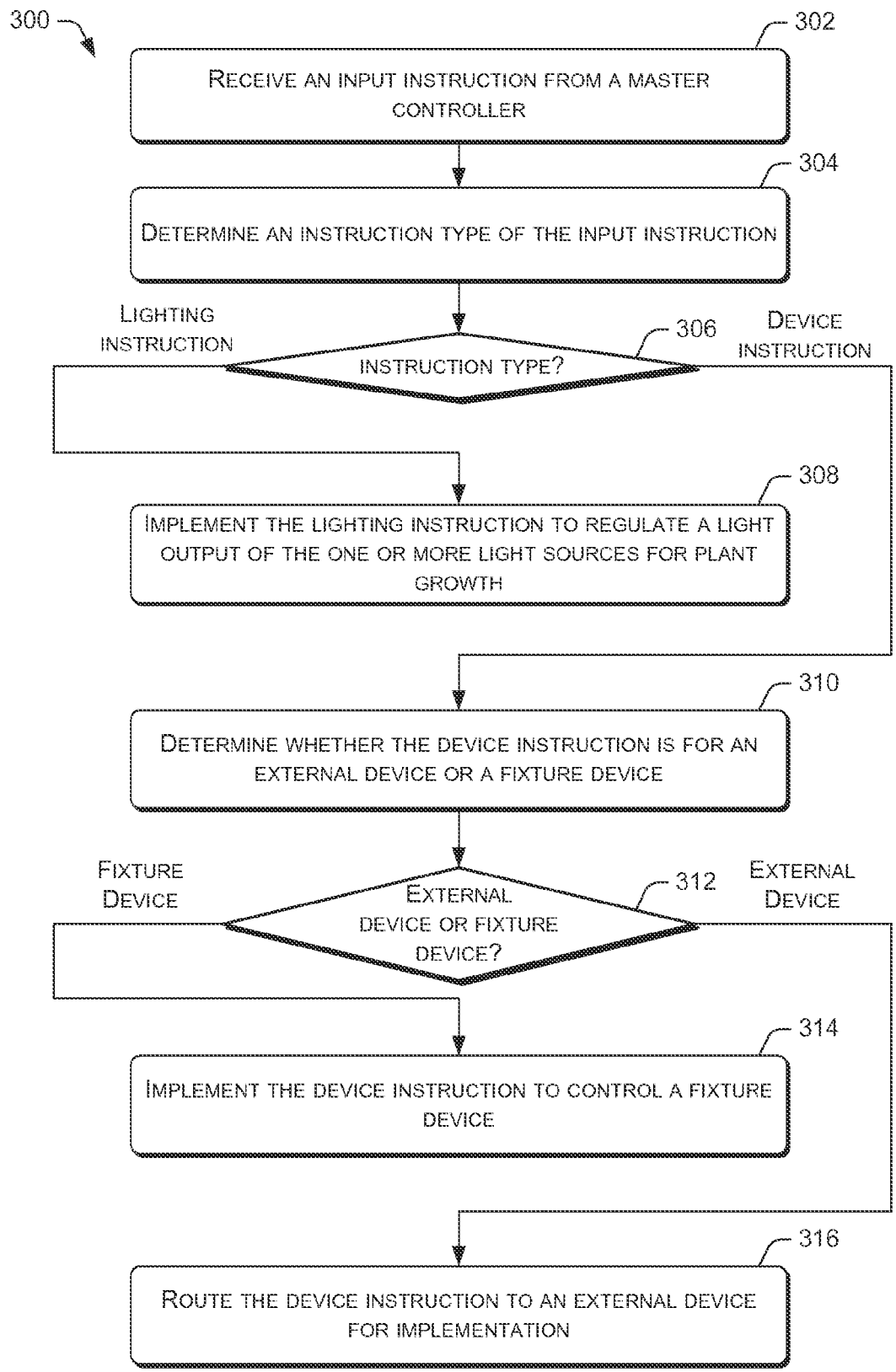
FIG. 3 is a flow diagram of an example process for receiving and implementing instructions to control light bulbs and other devices associated with the lighting fixture.
Figure 4:
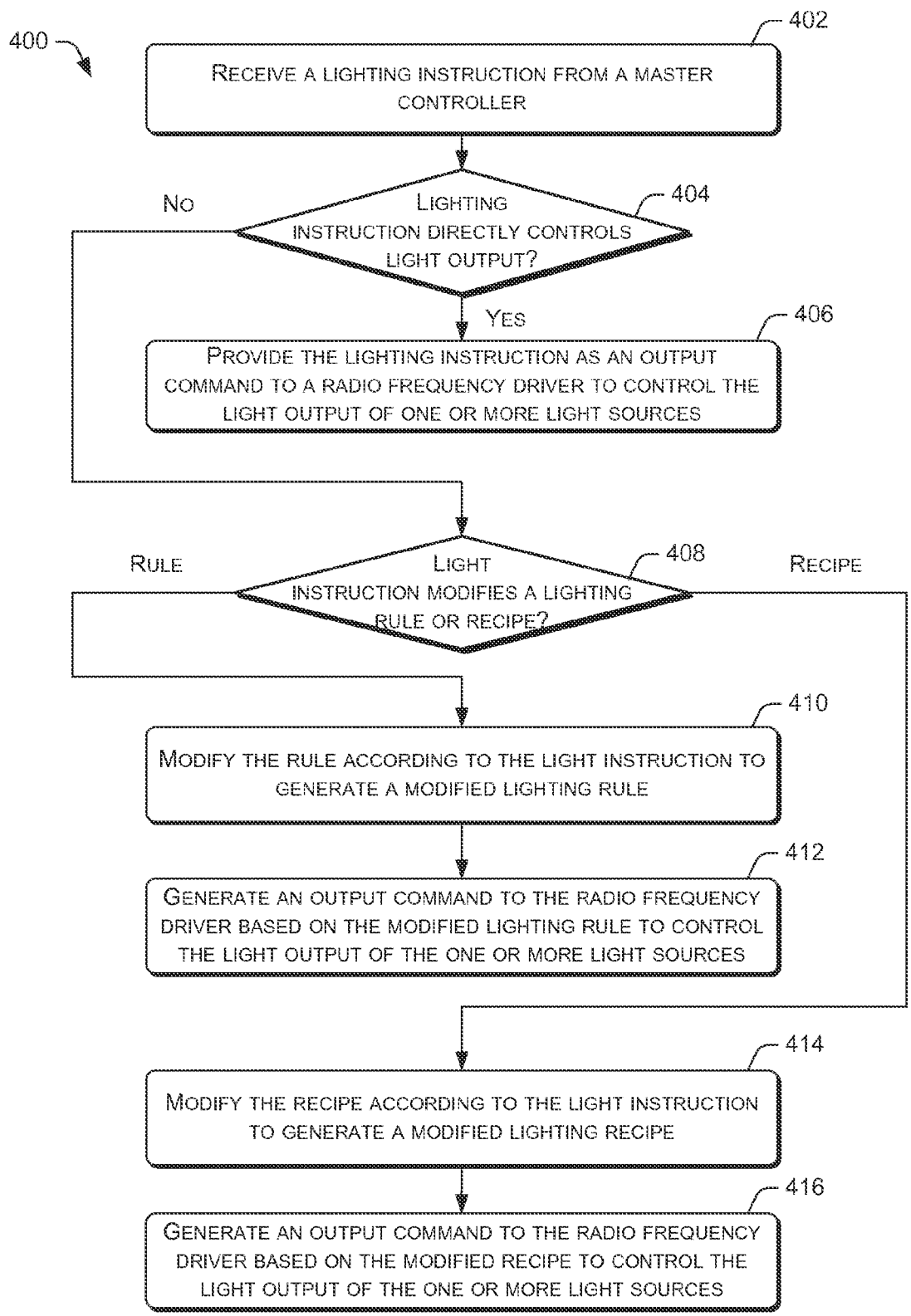
FIG. 4 is a flow diagram of an example process for implementing instructions from a master controller to control the light output of a lighting fixture.

FIGS. 3 and 4 present illustrative processes 300 and 400 for using a master controller to remotely control lighting fixtures via a network. Each of the processes 300 and 400 is illustrated as a collection of blocks in a logical flow chart, which represents a sequence of operations that can be implemented in hardware, software, or a combination thereof. In the context of software, the blocks resent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300 and 400 are described with reference to the architecture 100 of FIG. 1.

FIG. 3 is a flow diagram of an example process 300 for receiving and implementing instructions to control bulbs and other devices associated with the lighting fixture. At block 302, a lighting fixture may receive an input instruction from the master controller 108. The input instruction may be transmitted to the lighting fixture via a network. A communication interface of the lighting fixture may route the input instruction to the control application of the lighting fixture.

At block 304, the control application may determine an instruction type of the input instruction. In various embodiments, the instruction type of the input instruction may be designated by an indicator or flag that is embedded within the input instruction. For example, in the input instruction may be a lighting instruction that is intended for a radio frequency driver of the lighting fixture, or a device instruction that is intended for a fixture device or an external device associated with the lighting fixture. Thus, at decision block 306, if the control application determines that the input instruction is a lighting instruction, the process 300 may proceed to block 308.

At block 308, the control application may implement the lighting instruction to regulate a light output of the one or more light sources that is provided by the lighting fixture. In various embodiments, each light source may a plasma light bulb that generates light output for growing plants. In some instances, the lighting instruction may cause multiple light sources of the lighting fixture to produce differentiated light outputs.

However, returning to decision block 306, if the control application determines that the input instruction is a device instruction, the process 300 may proceed to block 310. At block 310, the control application may determine whether the device instruction is for an external device or a fixture device. For example, the lighting fixture 102(1) may include fixture devices 214 and may further communicate with external devices 222. In various embodiments, whether the device instruction is for an external device or a fixture device may be designated by an indicator or flag that is embedded within the instruction. Thus, at decision block 312, if the control application determines that the device instruction is for a fixture device, the process 300 may proceed to block 314.

At block 314, the control application may implement the device instruction to control a fixture device. In various embodiments, the device instruction may activate a cooling fan to provide additional cooling to the lighting fixture, adjust louvers to control an amount of light that is provided to a plant, or reposition reflectors to redirect light to a different portion of the plant, and/or so forth. However, returning to decision block 312, if the control application 218 determines that the device instruction is for an external device, the process 300 may proceed to block 316.

At block 316, the control application may route the device instruction to an external device for implementation. In various embodiments, the control application may use a wired or wireless communication interface to route the device instruction. Upon receiving the device instruction, the external device may implement the instruction to change an environment condition that affects the growth of plants. For example, the device instruction may adjust an irrigation control value to control the amount of water provided to a plant in a particular growth environment, command a HVAC system to cool or heat an enclosed space to a specific temperature, or command a humidifier to increase or decrease the humidity in a space.

FIG. 4 is a flow diagram of an example process 400 for implementing instructions from a master controller to control the light output of a lighting fixture. The example process 400 may further illustrate block 308 of the process 300. At block 402, the control application of a lighting fixture may receive a lighting instruction from the master controller 108. In various embodiments, the lighting instruction may be distinguishable from an instruction that directs a fixture device via an indicator or flag that is embedded in the instruction. At decision block 404, the control application may determine whether the lighting instruction directly controls the light output of the lighting fixture. For example, the lighting instruction may directly control the light output by commanding a radio frequency driver to change a frequency or an amplitude of the RF energy that is provided to one or more light bulbs of the lighting fixture. Thus, if the lighting instruction is for directly controlling light output ("yes" at decision block 404), the process 400 may proceed to block 406. At block 406, the control application may provide the lighting instruction as an output command to the radio frequency driver to control the light output of the one or more light sources of the lighting fixtures. In various embodiments, each of the light sources may be a plasma bulb that is activated by the radio frequency driver to produce light.

Returning to decision block 404, if the lighting instruction is not for directly controlling light output ("no" at decision block 404), the process 400 may proceed to decision block 408. At decision block 408, the control application may determine whether the light instruction modifies a rule or a recipe. Accordingly, if the control application determines that the light instruction modifies a rule, the process 400 may proceed to block 410.

At block 410, the control application may modify the rule according to the light instruction to generate a modified lighting rule. In various embodiments, the modification may include change the sensor inputs to monitor, modifying threshold sensor values that are used to trigger changes in light spectral distribution or light intensity, modify light spectral distribution or light intensity change responses to sensor inputs, and/or so forth.

At block 412, the control application may generate an output command to the radio frequency driver based on the modified lighting rule to control the light output of the one or more light sources. In various embodiments, each of the light sources may be a plasma bulb that is activated by the radio frequency driver to produce light.

Returning to decision block 408, if the control application determines that the light instruction modifies a recipe, the process 400 may proceed to block 414. At block 414, the control application may modify the recipe according to the light instruction to generate a modified lighting recipe. In various embodiments, the modification may include change the sensor inputs to monitor, modifying threshold sensor values that are used to trigger changes in light spectral distribution or light intensity, modify light spectral distribution or light intensity change responses to sensor inputs, modify growth cycles, growth targets, and/or so forth.

At block 416, the control application may generate an output command to the radio frequency driver based on the modified lighting recipe to control the light output of the one or more light sources. In various embodiments, each of the light sources may be a plasma bulb that is activated by the radio frequency driver to produce light.

Conventional lighting control techniques that use multiple independent controllers and timers may be costly and labor intensive to setup and maintain. Further, the manual setup and maintenance of these independent lighting control devices may be affected by user error, which may reduce horticultural production inefficiency or loss. In contrast, the user of plasma light technology and remote lighting control techniques may enable a single master controller to control a large number of lighting fixtures. For example, the single master controller may control up to thousands of lighting fixtures. Accordingly, the master controller may be programmed to execute intelligent light cycles on a large scale with a relatively small capital expenditure. Further, because the master controller is able to receive sensor inputs from sensors that are external to the lighting fixtures, the master controller may maintain awareness of the environmental conditions and adapt the lighting fixtures to changes in the environmental conditions. The master controller may use sensor inputs from the sensors internal to the lighting fixtures to prolong the operational longevity of the lighting fixtures. For example, the ability to detect that a component of a lighting fixture is overheating may enable the master controller to preemptively shutdown or reduce the light output of the lighting fixture.

The master controller may be used to control groups of lighting fixtures that are located in different geographical locations. For example, the groups of lighting fixtures may be located in different parts of a horticulture facility, different horticultural facilities in a general geographical area, or even in horticultural facilities that are located in different parts of the world. In this way, the installation of individual lighting controllers may be reduced or eliminated.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
    a plurality of lighting fixtures including control applications, the control applications to control radio frequency drivers of the lighting fixtures that drive plasma bulbs of the lighting fixtures to produce light output for growing plants; and
    a master controller executing on one or more computing devices, the master controller to send input instructions to the control applications of the lighting fixtures via a network, the input instructions being implemented by the control applications to command the radio frequency drivers to regulate at least one of a spectral distribution or an intensity of the light output of the lighting fixtures,
    the input instructions including an input instruction that directly commands at least one radio frequency driver of a light fixture to control a light output of the lighting fixture, or modifies a rule or a recipe that specifies a control application of the lighting fixture generate commands to the radio frequency driver according to one or more sensor inputs.

2. The system of claim 1, wherein directly commanding the at least one radio frequency driver includes directly commanding a plurality of radio frequency drivers of the lighting fixture to cause multiple plasma bulbs of the lighting fixture to produce differentiated light that differs in at least one of the spectral distribution or the intensity.

3. The system of claim 1, wherein the one or more sensor inputs include at least one of a sensor input from an internal lighting fixture sensor or a sensor input from a sensor that is external to the lighting fixture.

4. The system of claim 1, wherein the master controller sends input instructions that cause the lighting fixtures to generate light output that time shifts growth of plants.

5. The system of claim 1, wherein the plurality of the lighting fixtures comprise multiple groups of one or more lighting fixtures, and wherein the master controller sends input instructions that command each group of one or more lighting fixtures to produce corresponding light output that differs in at least one of spectral distribution or intensity from another light output of a different group of one or more lighting fixtures.

6. The system of claim 1, wherein the plurality of lighting fixtures comprise multiple groups of lighting fixtures, the multiple groups of lighting fixtures being located in a single horticultural facility, in different horticultural facilities, in a common geographical location, or in different geographical locations.

7. The system of claim 1, wherein the master controller is to further send a software update to a lighting fixture that include a new controller application, a new rule, or a new recipe, or send a software patch to the lighting fixture that fixes a software error in the controller application.

8. The system of claim 1, wherein the master controller is accessible via a web interface application, the master controller to send an input instruction to a lighting fixture following a login of a user to the web interface application via one or more authentication credentials.

9. The system of claim 1, wherein a control application on a lighting fixture receives an input instruction from the master controller that includes a device command for a device associated with the lighting fixture, and sends the device command to the device associated with the lighting fixture.

10. The system of claim 9, wherein the device associated with the lighting fixture is a fixture device on the lighting fixture or an external device that is outside of the lighting fixture, wherein the device command instructs the fixture device to modify the light output that reaches a plant or to modify an operational condition of the lighting fixture, or instructs the external device to modify an environmental condition that affects growth of the plant.

11. A method, comprising:
receiving, at a control application on a lighting fixture that produces light output for growing a plant, an input instruction from a master controller that is executing on one or more computing devices, the input instruction being transmitted to the lighting fixture via at least one of a wireless or wired network;
sending the input instruction as an output command to a radio frequency driver of the lighting fixture that drives a plasma bulb to produce the light output in response to the input instruction being a direct instruction for the radio frequency driver, the output command changing a spectral distribution or intensity of the light output; and
modifying a rule or a recipe specifying that the control application generate at least one command to the radio frequency driver according to one or more sensor inputs in response to the input instruction being a modification instruction for the rule or the recipe.

12. The method of claim of claim 11, further comprising sending the input instruction as a device command to a device associated with the lighting fixture in response to the input instruction being a device instruction.

13. The method of claim of claim 12, wherein the device command is for a fixture device on the lighting fixture, the device command to instruct the fixture device to modify the light output that reaches the plant or to modify an operational condition of the lighting fixture.

14. The method of claim 13, wherein the device command is for a cooling fan that cools the lighting fixture, movable louvers that adjust an amount of the light output on a plant, or an adjustable reflector that directs the light output on the plant.

15. The method of claim 12, wherein the device command is for an external device that is outside of the lighting fixture, the device command to instruct the external device to modify an environmental condition that affects growth of the plant.

16. The method of claim 15, wherein the device command is for an irrigation control system, a humidifier, a dehumidifier, a Heating Ventilation and Air Conditioning (HVAC) system, or a nutrient feeding system.

17. The method of claim of claim 11, further comprising generating an additional output command to the radio frequency driver based on the rule following a modification of the rule, the additional output command changing a spectral distribution or intensity of the light output for growing the plant.

18. The method of claim of claim 11, further comprising generating additional output commands to the radio frequency driver based on the recipe following a modification of the recipe, the additional output commands changing a spectral distribution or intensity of the light output during a growth cycle for the plant.

19. One or more non-transitory computer-readable media storing computer-executable instructions that upon execution cause one or more processors to perform acts comprising:
receiving, at a control application on a lighting fixture that produces light output for growing a plant, an input instruction from a master controller that is executing on one or more computing devices, the input instruction being transmitted to the lighting fixture via at least one of a wireless or wired network;
sending the input instruction as an output command to a radio frequency driver of the lighting fixture that drives a plasma bulb to produce the light output in response to the input instruction being a direct instruction for the radio frequency driver, the output command changing a spectral distribution or intensity of the light output; and
modifying a rule or a recipe specifying that the control application generate at least one command to the radio frequency driver according to one or more sensor inputs in response to the input instruction being a modification instruction for the rule or the recipe, the sensors inputs being from an internal sensor that monitors an operational condition of the lighting fixture or an external sensor that monitor an environmental condition that affects growth of the plant.

20. The one or more non-transitory computer-readable media of claim 19, further comprising sending the input instruction as a device command to a device associated with the lighting fixture in response to the input instruction being a device instruction.

* * * * *